United States Patent

Iwasaki et al.

[15] 3,678,390

[45] July 18, 1972

[54] FREQUENCY MODULATION COMMUNICATION SYSTEM

[72] Inventors: Masahiro Iwasaki; Nobuyuki Goto, both of Yokohama-shi; Hiroya Fujisaki; Kunihiko Niwa, both of Tokyo, all of Japan

[73] Assignee: Tokyo Shibaura Electric Co., Ltd., Kawasaki-shi, Japan

[22] Filed: Oct. 8, 1969

[21] Appl. No.: 864,670

[30] Foreign Application Priority Data

Oct. 11, 1968 Japan....................................43/73748
Oct. 11, 1968 Japan....................................43/73749

[52] U.S. Cl.....................................325/46, 179/1 P, 325/32, 325/65

[51] Int. Cl...........................................................H04b 1/62

[58] Field of Search........................325/32, 35, 45, 46, 59, 61, 325/62, 65; 179/1 P, 1 D, 15.55; 333/28, 28 A, 14

[56] References Cited

UNITED STATES PATENTS

| | | | |
|---|---|---|---|
| 1,841,142 | 1/1932 | Mathes | 325/65 X |
| 1,907,109 | 5/1933 | Hinton | 325/65 X |
| 2,407,259 | 9/1946 | Dickieson | 325/35 |
| 3,478,169 | 11/1969 | Saito | 325/45 X |

*Primary Examiner*—Benedict V. Safourek
*Attorney*—Flynn and Frishauf

[57] ABSTRACT

The frequency modulation communication system modifies the frequency spectrum of transmission signals in transmission and reception so as to allow them to have desired characteristics, equivalently improves the signal-to-noise ratio (S/N ratio) and consequently improves the articulation of signals particularly associated with speech, thereby enabling a prescribed frequency band to be prominently compressed. For modification of the frequency spectrum, there are used means for inverting frequency spectra and means for rearranging or interchanging them.

2 Claims, 9 Drawing Figures

FREQUENCY MODULATION COMMUNICATION SYSTEM

The present invention relates to a frequency modulation communication system which modifies the frequency spectrum of signals in transmission and reception, equivalently improves the signal-to-noise ratio and consequently improves the articulation of said signal, thus enabling a frequency band to be prominently compressed.

The mobile wireless communication system as used in rolling stock and shipping has heretofore been of the frequency modulation type. As a result of recent increases in subscribers, however, there occurs noticeable interference among the signals of said type used by them and there is raised a problem as to the deficiency of frequency bands. Accordingly, there is practiced a process of limiting, for example, the conventional frequency bandwidth of 50 KHz per communication channel to half its value or that of 25 KHz. There also arises the necessity of further compressing a prescribed frequency band. On the other hand, such limitation of the prescribed frequency band is unavoidably accompanied with a decrease of the signal-to-noise ratio. The resultant question is, therefore, how the prescribed frequency band can be compressed without degrading the articulation of signals.

The communication system known to date uses an equalizer as means for resolving this problem. According to said system, there are supplied transmission signals to a transmission equalizer which varies the amplitude-frequency characteristics of said signals in proportion to their frequency when they are supplied thereto. Outputs from said equalizer are modulated by an amplitude modulator and sent forth to a receiver by a transmitter through a transmission channel, for example, a wireless transmission channel. It is generally during transmission through said wireless transmission channel that there arise noises which decrease the signal-to-noise ratio.

Signals supplied to the receiver are demodulated by a frequency demodulator and pass through a receiving equalizer having amplitude-frequency characteristics exactly opposite to those of the transmission equalizer, obtaining the final form of received signals. Namely, the prior art system allows transmission signals to pass through both transmission and receiving equalizers to produce demodulated outputs, the noise component of which alone is reduced, without changing the frequency spectrum of signals.

However, such frequency modulation communication system only permits the effect of noises to be reduced, and fails to obtain an optimum signal-to-noise ratio for specific signals, particularly, those representing speech, so that said system has not yet offered a fully satisfactory resolution for the problem of the deteriorated signal-to-noise ratio unavoidably encountered with the compression of a prescribed frequency band where there are transmitted speech signals.

The object of the present invention is to provide a frequency modulation communication system capable of improving the signal-to-noise ratio associated with a prescribed frequency band to permit its compression with respect to the previously set signal-to-noise ratio. This object can be attained by installing means for modifying the frequency spectrum of particular transmission signals in transmission and reception, namely, a frequency spectrum inverter and/or a frequency spectrum rearrangement device.

This invention can be more fully understood from the following detailed description when taken in connection with the accompanying drawings, in which.

Figure 7:
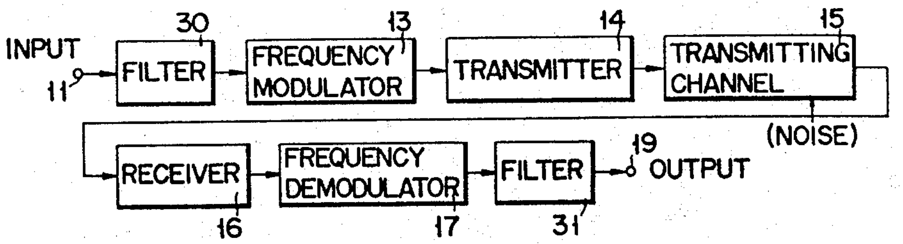
Figure 3:
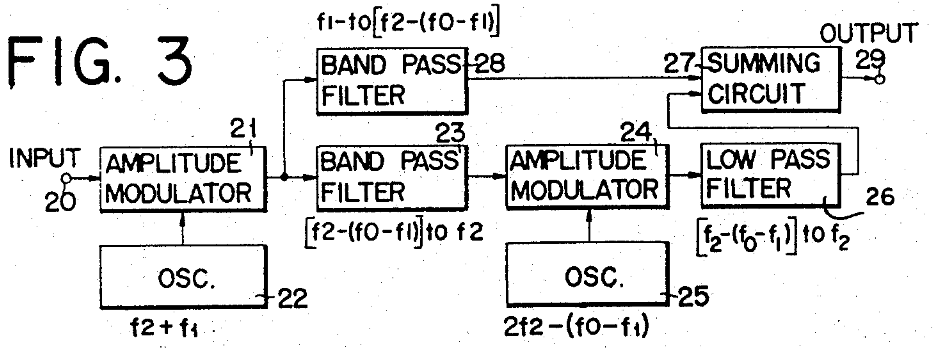
FIG. 3 illustrates a circuit arrangement of the frequency spectrum rearrangement circuit shown in FIG. 1.
Figure 4:
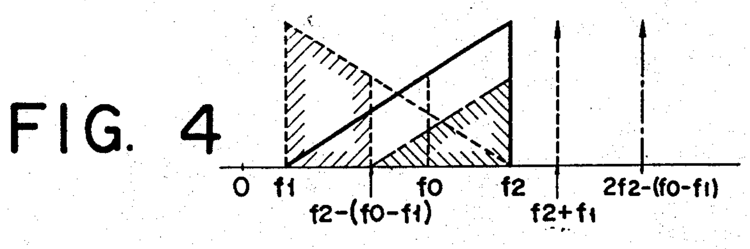
Figure 9:
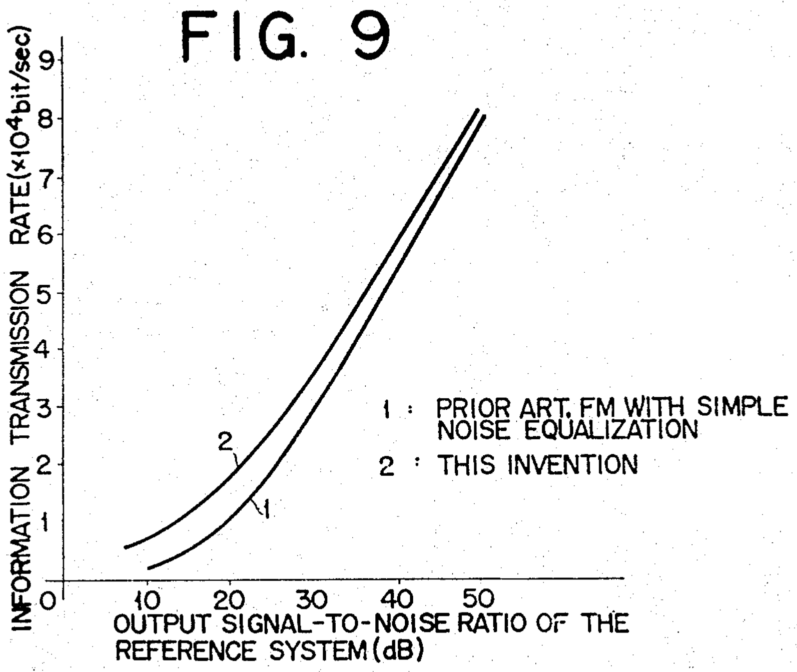
Figure 5:
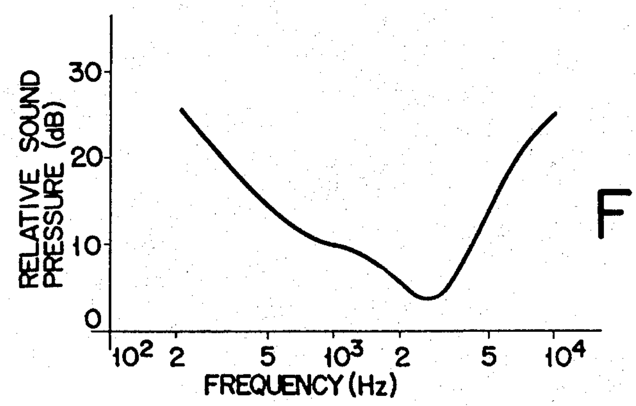
Figure 6:
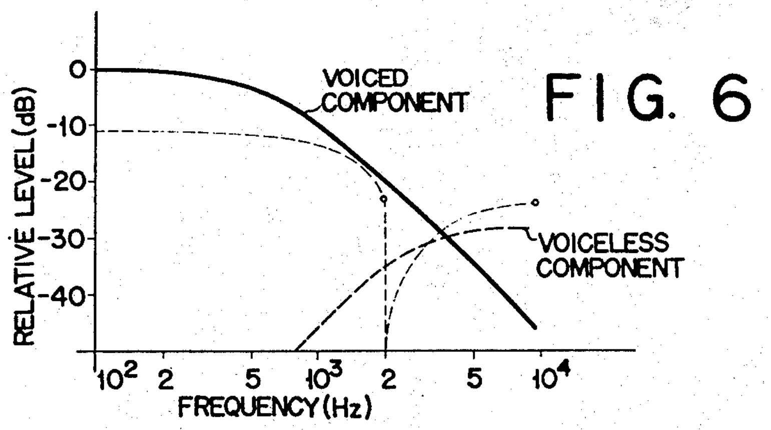
Figure 8:
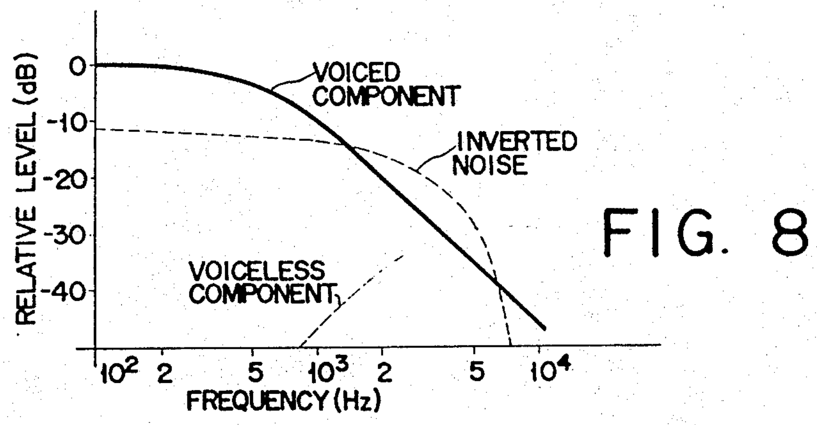

FIG. 4 indicates a spectrum distribution by way of illustrating the operation of the circuit of FIG. 3;

FIG. 5 is a curve showing the auditory sensitivity of normal people;

FIG. 6 is a curve showing the frequency spectrum of speech signals and that of frequency modulation noise signals associated with a frequency modulation communication system according to the foregoing embodiment of the invention;

FIG. 7 is a circuit diagram of a frequency modulation communication system according to another embodiment of the invention;

FIG. 8 is a curve showing the frequency spectrum of speech signals and that of frequency modulation noise signals according to the embodiment of FIG. 7; and FIG. 9 is a curve showing the relationship of signal-to-noise ratio versus information transmission rate according to the communication system of the invention in comparison with that of the prior art.

Figure 1:
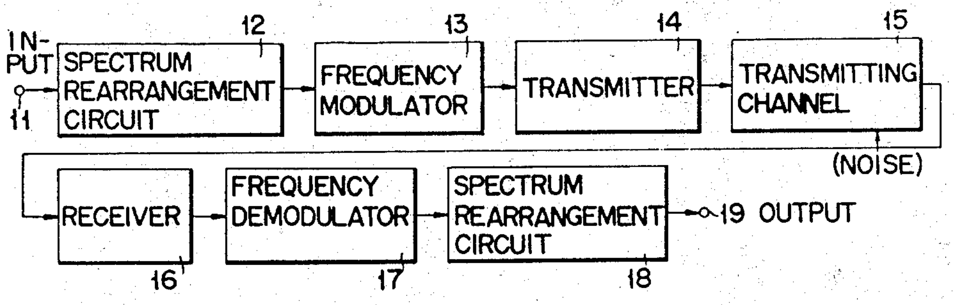
FIG. 1 is a circuit arrangement of a frequency modulation communication system according to an embodiment of the present invention.

There will now be described an embodiment of the present invention by reference to FIGS. 1 to 6. As shown in FIG. 1, signals supplied to an input terminal 11 are introduced through a frequency spectrum rearrangement circuit 12 on the transmission side for separating said input signals into suitable frequency bands for interchange of frequency spectra. Outputs from said circuit 12 are modulated by a frequency modulator 13 and sent to a receiver 16 by a transmitter 14 through a transmission channel, for example, a wireless transmission channel 15. In this case noise in the signal appears during the transmission of electric waves through the transmission channel 15. Transmission signals supplied to the receiver 16 are detected by a frequency demodulator 17 and then pass through a frequency spectrum rearrangement circuit 18 on the receiving side which brings the frequency spectrum of the received signals to that of the signals initially supplied to the frequency spectrum rearrangement circuit 12 on the transmission side, outputs being taken out at an output terminal 19.

Figure 2:
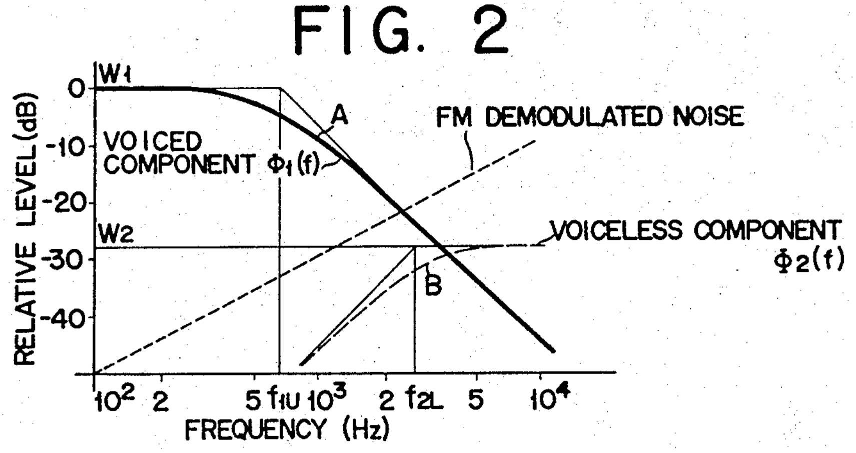
FIG. 2 is a curve showing the general frequency spectrum distribution of speech signals and that of frequency modulation noise signals.

There will now be described the frequency spectrum rearrangement circuits 12 and 18 on the transmission and receiving sides respectively. In the following discussion there is taken particular notice of the different degrees of contribution offered by these frequency spectrum rearrangement circuits 12 and 18 to the articulation of the individual frequency components of speech signals. As shown in FIG. 2, the speech signal consists of voiced components A and voiceless components B. Referring to the frequency characteristics of said components, the frequency spectrum of the voiced components is concentrated in a low frequency region and that of the voiceless components in a high frequency region. With respect to the amplitude distribution, that of the voiced components may be designated as a negative exponential type and that of the voiceless components as a substantially Gaussian type. While the quality of communication system is generally evaluated by the articulation of signal associated therewith, the voiceless components of small energy are known, under a good condition of the signal-to-noise ratio, to make as much contribution to the articulation of signals as the voiced components. With the prior art equalization system, however, the signal-to-noise ratio was appreciably lower in the voiceless components than in the voiced components, causing the articulation of signals associated with the former components likely to decrease from that of the former. Accordingly, if the signal-to-noise ratio in the voiceless components can be improved, then there will be increased the articulation of the signal, though the general signal-to-noise may be fixed, so that said ratio will be equivalently improved with the resultant resolution of the problem of the deteriorated signal-to-noise ratio encountered with the compression of a prescribed frequency band. According to the present invention, therefore, the frequency spectrum of the voiced components is divided into suitable frequency bands and the high frequency region is interchanged for a low frequency region or vice versa. Since this operation still raises the signal-to-noise ratio with respect to the voiceless components, the present invention primarily aims at such interchange of frequency spectra.

There will now be described by reference to FIGS. 3 and 4 the operation of frequency spectrum rearrangement circuits 12 and 18 disposed on the transmission and receiving sides respectively. Let us consider the case where signals having frequency bands $f_1$ to $f_0$ involved in the signals having frequency bands $f_1$ to $f_2$ ($f_1<f_2$) are shifted as they are to the region of frequency bands $f_2-(f_0-f_1)$ to $f_2$ with the frequency bands $f_0$ to $f_2$ reversed to $f_1$ to $f_1+(f_2-f_0)$. Components having frequency bands $f_1$ to $f_0$ involved in the frequency bands $f_1$ to $f_2$ of input signals supplied to an input terminal are amplitude modulated in a first amplitude modulator 21 by an oscillated frequency $f_2+f_1$ from a first oscillator 22. The output of first amplitude modulator is applied to a first band pass filter 23 for taking out lower band components $f_2-(f_0-f_1)$ to $f_2$. Thereafter, the obtained lower band components are amplitude modulated in a second amplitude modulator 24 by an oscillated signal having a frequency $2f_2-(f_0-f_1)$ from a second oscillator 25 and then pass through a low pass filter 26 so as to allow the frequency spectrum to be inverted by taking out lower band components $f_2-(f_0-f_1)$ to $f_2$, said frequency components $f_2-(f_0-f_1)$ to $f_2$, being supplied to a summing circuit. On the other hand, components having frequency bands $f_0$ to $f_2$ involved in the frequency bands $f_1$ to $f_2$ of input signals supplied to the input terminal 20 are amplitude modulated in the first amplitude modulator 21 by an oscillated frequency $f_2+f_1$ from the first oscillator 22 and then pass through a second band pass filter 28 so as to allow the frequency spectrum to be inverted by taking out a portion $f_1$ to $f_2-(f_0-f_1)$ involved in the lower band component. Said frequency band $f_1$ to $f_2-(f_0-f_1)$ is supplied to the summing circuit, obtaining at an output terminal 29 a transmission signal wherein the high frequency component is interchanged for a low frequency component and the low frequency component thereof is interchanged for a high frequency component. When, on the receiving side, the low frequency component of the input signal is interchanged for a high frequency component and the high frequency component thereof is interchanged for a low frequency component, then the frequency characteristics of said input signal can be easily brought back to the original state.

As shown in FIG. 6, therefore, with a frequency modulation communication system involving a frequency spectrum rearrangement circuit according to the aforesaid embodiment, there is only varied the frequency spectrum of noise signals, while that of speech signals remains unchanged. FIG. 6 is a diagram of the frequency spectrum with $f_0$ set at about 2 KHz. Said arrangement of frequency spectrum improves the signal-to-noise ratio with respect to the voiceless component and consequently the articulation of signals with respect to the same signal-to-noise ratio without carrying out qualization as has been the case with the prior art communication system. Since, the frequency spectrum of noise signals is modified into a form adapted for a curve representing the auditory sensitivity of human beings as shown in FIG. 5, there can be improved their sense of hearing noises even of the same energy. As is evident in FIG. 5, it is therefore desirable that the frequency $f_0$ be in the range of 2,000 to 4,000 Hz. Obviously, given a fixed degree of articulation, the signal-to-noise ratio can be reduced and the deviation of modulated frequency is minimized, enabling a prescribed frequency band to be compressed.

As mentioned above, the present invention offers a great advantage in that there is prominently compressed the prescribed frequency modulation band and there is reduced the subjective effect of noises on auditory perception. Thus the invention provides a frequency modulation communication system of simple arrangement which interchanges the frequency spectra of only the voiced components of speech signals and improves the articulation of signals with respect to the same signal-to-noise ratio, or equivalently increases said ratio, enabling a prescribed frequency band to be prominently compressed with the effect of noises on man's ear sensitivity being minimized.

Also, use of a syllabic compressor or instantaneous compressor jointly therewith on the transmission side and the corresponding syllabic expander or instantaneous expander jointly therewith on the receiving side for the level-up of small amplitude signals will give far better results.

The foregoing embodiment involved a frequency rearrangement (or interchange) circuit as a means for modifying the frequency spectrum of signals. However, the application of the undermentioned frequency spectrum inverter will also have the same effect.

There will now be described the embodiment of FIG. 7. As shown therein, input signals supplied to an input terminal 11 pass through, for example, a frequency spectrum inversion circuit 30 consisting of an amplitude modulator and band pass filter to invert frequency spectra, and then are amplitude modulated by an amplitude modulator 13 and sent to a receiver 16 by a transmitter 14 through a transmission channel 15. It is during transmission of electric waves through the transmission channel 15 that there are carried in noises. Transmission signals supplied to the receiver 16 are detected by a frequency demodulator 17 and then pass through a frequency spectrum inversion circuit 31 on the receiving side which consists of, for example, an amplitude modulator and band pass filter to bring the frequency spectrum of received signals back to the original state, obtaining output signals at an output terminal 19.

There will now be described frequency spectrum inversion circuits 30 and 31 disposed on the transmission and receiving sides respectively. In the following discussion there is taken particular notice, as in the preceding embodiment, of the different degrees of contribution offered by these inversion circuits to the articulation of the frequency components of speech signals.

Since the articulation of signals is not a quantity capable of being easily computed from the frequency distribution, there is discussed below the information transmission rate closely associated with said articulation. With the frequency bands of signals designated as $f_1$ to $f_2$ and the entropy power density of signals and that of noises (or power spectral density of white Gaussian noises having the same entropy in the same frequency band) as $S_E(f)$ and $n_E(f)$ respectively, then the information transmission rate R may be expressed as $$R = \int_{f_1}^{f_2} \log_2 \frac{S_E(f) + n_E(f)}{n_E(f)}\, df \text{ (bit/sec)} \qquad (1)$$

A value represented by equation 1 above is known to be a quantity intimately associated with the articulation of signals and can be used as a measure for theoretical examination of said articulation. With the total noise power involved in the frequency band of signals in the case of the frequency modulation communication system represented by N, then there will result $$n_E(f) = \frac{3N}{f_2^3 - f_1^3} f^2 \qquad (2)$$

and the power spectral densities $\Phi_1(f)$ and $\Phi_2(f)$ of the voiced and viceless components respectively of noise signals may be approximated by the following equations.

$$\Phi_1(f) = \frac{W_1}{[1 + (f/f_{1u})^2]^2} \text{ (voiced component)} \qquad (3)$$

$$\Phi_1(f) = \frac{W_2}{[1 + (f_{2l}/f)^2]^2} \text{ (voiceless component)} \qquad (4)$$

where $W_1$, $W_2$, $f_{1u}$, $f_{2l}$, are as shown in FIG. 2.

Assuming the voiced component to have an exponential distribution and the voiceless component to have a Gaussian distribution, then their respective entropy power density will be $S_{E1}(f) = (e/\pi)\, \Phi_1(f)$ (voiced component) 5

$S_{E2}(f) = \Phi_2(f)$ (voiceless component) 6

From these equations, therefore, can be computed the information transmission rate R.

In detected outputs from the demodulator 17 involved in the frequency modulation communication system of FIG. 7, there is inverted the frequency spectrum of only noise signals, while that of the speech signals remains unchanged. Since the power spectral density $n_E(f)$ of signals associated with frequency modulation noises may be given by equation 2 above, there will result the following equation in case the frequency spectrum is inverted.

$$n_R(f) = \frac{3N}{f_2^3 - f_1^3}(f-f_2)^2 \qquad (7)$$

With $f_2$ = 8,000 Hz, therefore, there will be increased the signal-to-noise ratio with respect to the voiceless component without carrying out equalization, with the resultant improvement of the information transmission rate.

FIG. 9 shows the information transmission rate of the frequency modulation communication system according to the embodiment of FIG. 7 involving a frequency spectrum inversion circuit, in comparison with that of the prior art frequency modulation communication system involving no extra operation. As seen from FIG. 9, the frequency modulation communication system according to the embodiment of FIG. 7 using a frequency spectrum inversion circuit permits the signal-to-noise ratio to be reduced about 6 dB with respect to the same information transmission rate. This means that to obtain the same quality of communication, the frequency modulation band can be reduced to half of what has been prescribed, a prominent compression of said frequency band.

In addition to the favorable effect derived from such theoretical computation, the embodiment of FIG. 7 has the following advantages:

1. Where the frequency spectrum is inverted after equalization of signals as has been practiced in the prior art, the high frequency component of output noise signals is further suppressed, leading to the increased information transmission rate with respect to the voiceless component and the elevation of the general articulation of signals.
2. As shown in FIG. 5, the curve representing man's ear sensitivity falls at a low frequency region, so that the greater portion of the frequency spectrum of noise signals is brought to the region where said ear sensitivity drops. Accordingly, when heard by the ear, the same current of noise signals will present less obstruction.

The foregoing two embodiments relate to the case where signals were limited to those of speech and the power spectral density function could be expressed as a sum of two power spectral density functions. However, it will be apparent that the present invention is effectively applicable to signals which may be represented by a signal power spectral density function. Obviously, the invention can also be employed in the case where there are transmitted by the frequency modulation transmission system those signals whose power spectral density function may be indicated by a sum of two or more of said functions.

What we claim is:

1. A frequency modulation communication system for communicating speech signals which include a voiced and a voiceless signal components, said system comprising:

a frequency modulation transmission means having a frequency modulator and a first processing circuit for interchanging the frequency spectra of said voiced component and said voiceless component in the frequency band of said speech signals prior to frequency modulation of said speech signals; and a frequency modulation receiving means for receiving said speech signals transmitted from said transmission means, said receiving means having a frequency demodulator and a second processing circuit coupled to the output of said frequency demodulator for bringing the frequency spectra of said interchanged voiced and voiceless signal components back to the original state in the frequency band of said speech signals, thereby improving the signal-to-noise ratio as well as the articulation of said speech signals, each of said first and second processing circuits including:

a first oscillator for generating a first signal having a frequency $f_1 + f_2$, where $f_1 < f_2$ and each of the frequencies $f_1$ and $f_2$ is included in the frequency band of said speech signals;

a first amplitude modulator for amplitude modulating said first signal with a second signal having a frequency band $f_1$ to $f_2$ to obtain an inverted signal having a frequency band $f_2$ to $f_1$;

a first band pass filter for taking out the lower side band components of frequencies $[f_2 - (f_0 - f_1)]$ to $f_2$ from the output of said first frequency modulator, where $f_1 < f_0 < f_2$ and the frequency $f_0$ is in the range of 2,000 to 4,000 Hz;

a second oscillator for generating a second signal having a frequency $[2f_2 - (f_0 - f_1)]$;

a second amplitude modulator for amplitude modulating said second signal with said taken out lower side band components;

a low pass filter for taking out the lower side band components of frequencies $[f_2 - (f_0 - f_1)]$ to $f_2$ from the output of said second amplitude modulator;

a second band pass filter for taking out the frequency band components $f_1$ to $[f_2 - (f_0 - f_1)]$ from the output of said first amplitude modulator; and a summing circuit for summing up the outputs from said low pass filter and said band pass filter.

2. A frequency modulation communication system according to claim 1 wherein said transmission means further includes means for inverting the frequency spectra each of said interchanged voiced and voiceless signal components, and said receiving means further includes means for bringing the frequency spectra of said interchanged and inverted voiced and voiceless signal components back to their original state.

* * * * *